United States Patent
Okumura et al.

(10) Patent No.: US 8,006,878 B2
(45) Date of Patent: Aug. 30, 2011

(54) SPLITTING METHOD AND DEVICE FOR CONNECTING ROD

(75) Inventors: Hideki Okumura, Koga (JP); Yuukou Hashimoto, Mooka (JP); Tsuguo Koguchi, Nasukarasuyama (JP)

(73) Assignee: Honda Motor Co., Ltd., Tokyo (JP)

( * ) Notice: Subject to any disclaimer, the term of this patent is extended or adjusted under 35 U.S.C. 154(b) by 242 days.

(21) Appl. No.: 11/667,677

(22) PCT Filed: Nov. 22, 2005

(86) PCT No.: PCT/JP2005/021484
§ 371 (c)(1),
(2), (4) Date: May 14, 2007

(87) PCT Pub. No.: WO2006/057257
PCT Pub. Date: Jun. 1, 2006

(65) Prior Publication Data
US 2008/0011801 A1    Jan. 17, 2008

(30) Foreign Application Priority Data

Nov. 25, 2004  (JP) .................. 2004-339809
Nov. 25, 2004  (JP) .................. 2004-339811

(51) Int. Cl.
*B26F 3/02* (2006.01)
(52) U.S. Cl. ...................... 225/104; 225/103
(58) Field of Classification Search .................. 225/104, 225/105
See application file for complete search history.

(56) References Cited

U.S. PATENT DOCUMENTS

| | | | | |
|---|---|---|---|---|
| 5,169,046 A | * | 12/1992 | Miessen et al. | 225/100 |
| 6,386,417 B1 | * | 5/2002 | Jones et al. | 225/103 |
| 6,457,621 B1 | * | 10/2002 | Hahnel et al. | 225/103 |
| 6,578,748 B2 | | 6/2003 | Matsuoka et al. | |
| 6,609,643 B1 | * | 8/2003 | Jones | 225/2 |
| 2002/0023939 A1 | | 2/2002 | Hase | |

FOREIGN PATENT DOCUMENTS

| JP | 5-261626 A | 10/1993 |
|---|---|---|
| JP | 10-277848 A | 10/1998 |
| JP | 2000-071128 A | 3/2000 |
| JP | 2000-071129 A | 3/2000 |
| JP | 2000-0171130 A | 3/2000 |
| JP | 2002-66998 A | 3/2002 |
| JP | 2004-162809 A | 6/2004 |

* cited by examiner

*Primary Examiner* — Kenneth E. Peterson
(74) *Attorney, Agent, or Firm* — Birch, Stewart, Kolasch & Birch, LLP

(57) ABSTRACT

A splitting devices for a connecting rod, having a fixed stage fixed on a base, a movable stage installed so as to be approachable and departable from the fixed stage, a load mechanism for applying a breaking load to a press fit direction of a wedge member, and second hydraulic cylinders for clamping a cap section by pressing from above an end section of third work support members. The third work support members and the second hydraulic cylinders are individually fixed to the movable stage so as to be displaceable together with the movable stage.

9 Claims, 14 Drawing Sheets

FIG. 1A
FIG. 1B
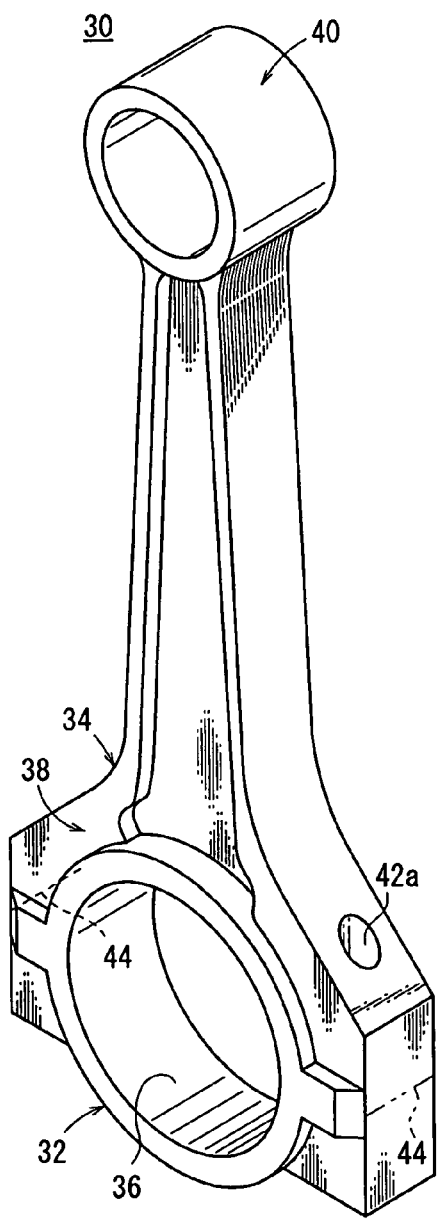
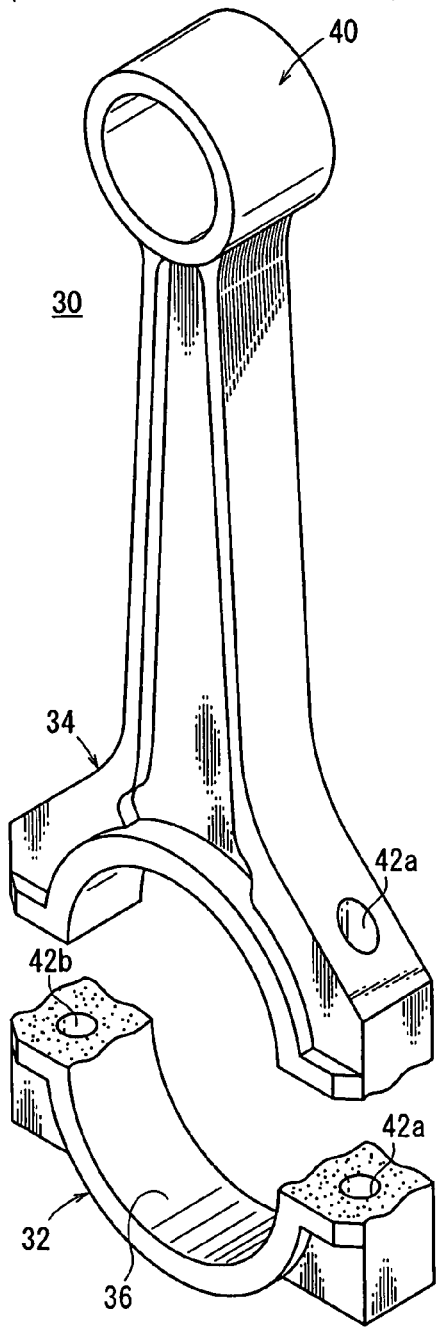

SPLITTING METHOD AND DEVICE FOR CONNECTING ROD

TECHNICAL FIELD

The present invention relates to a method of and an apparatus (device) for cracking (splitting) a connecting rod as an engine component for vehicles, for example, and more particularly to a method of and an apparatus for cracking a one-piece connecting rod having a larger end and a smaller end manufactured to fracture the larger end into a cap and a rod.

BACKGROUND ART

Connecting rods which connect piston pins and crankpins have been widely employed in engines for vehicles, for example. A connecting rod has a larger end connected to the crankpin and a smaller end connected to the piston pin. For manufacturing a connecting rod, it is customary to integrally form a connecting rod from the larger end to the smaller end by forging or the like, for example, and then crack the larger end into a cap part and a rod part.

A method of cracking a connecting rod disclosed in Japanese Laid-Open Patent Publication No. 10-277848, for example, comprises the steps of providing an internal pressure applying device for applying an outward internal pressure to a bearing hole in the bearing of a connecting rod and a pair of external pressure applying devices for applying an external pressure to the bearing, applying an external pressure to the bearing from the pair of external pressure applying devices and an internal pressure to the bearing from the internal pressure applying device, and instantaneously releasing the external pressure from the external pressure applying devices while the internal pressure to the bearing from the internal pressure applying device is of a level capable of cracking the bearing, thereby enabling the internal pressure to instantaneously crack the bearing.

Japanese Laid-Open Patent Publication No. 2002-66998 discloses an apparatus for fracturing a connecting rod, comprising first and second support members for horizontally supporting a connecting rod, the first and second support members being disposed on a base of a pallet for placing the connecting rod thereon and movable in directions away from each other, a split mandrel having mandrel halves vertically mounted on the first and second support members and having respective outer circumferential surfaces for abutment against respective inner surfaces of an opening part, a wedge having tapered surfaces abutting against confronting end surfaces of the mandrel halves, for uniformly separating and spreading the mandrel halves away from each other, an actuator for applying a load to the wedge, and a control circuit for applying an initial load to the actuator to bring the mandrel halves into abutment against the respective inner surfaces of the opening part and thereafter applying a fracture load to the opening part for instantaneously fracturing.

DISCLOSURE OF INVENTION

According to the cracking method disclosed in Japanese Laid-Open Patent Publication No. 10-277848, it is difficult to control the timing to detect a cracking internal pressure and instantaneously release the external pressure from the external pressure applying devices, because of variations due to manufacturing errors of the connecting rod.

The fracturing apparatus disclosed in Japanese Laid-Open Patent Publication No. 2002-66998 tends to fail to fully restrain horizontal oscillations that occur when the larger end is fractured into the cap part and the rod part. It is difficult to shorten the time lag between a prior fracture on one of the left and right cracking regions and a subsequent fracture on the other.

It is a general object of the present invention to provide an apparatus for cracking a connecting rod, in which there is no need to establish timing to release the external pressure, and any time lag between the prior fracture and the subsequent fracture is minimized.

It is a main object of the present invention to provide a method of cracking a connecting rod, in which there is no need to establish timing to release the external pressure, and any time lag between the prior fracture and the subsequent fracture is minimized.

BRIEF DESCRIPTION OF DRAWINGS

FIG. 1A is a perspective view of a connecting rod to which the present invention is applicable;

FIG. 1B is a perspective view of the connecting rod shown in FIG. 1A, which has been cracked into a cap part and a rod part;

BEST MODE FOR CARRYING OUT THE INVENTION

Figure 2:
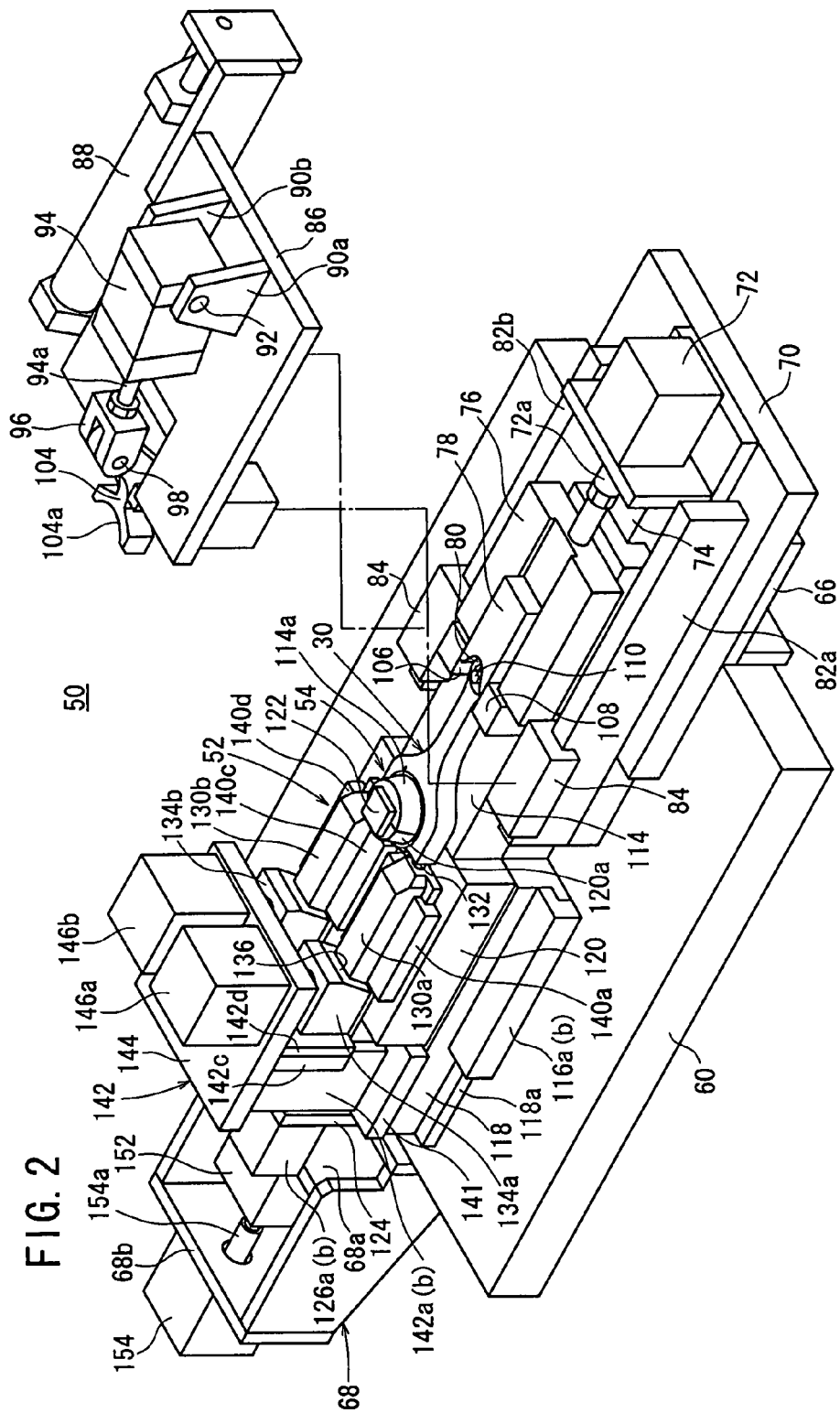
FIG. 2 is an exploded perspective view of a cracking apparatus for carrying out a method of manufacturing a connecting rod according to an embodiment of the present invention.

FIG. 1A is a perspective view of a connecting rod 30 as a workpiece to which the present invention is applicable, and FIG. 1B is a perspective view of the connecting rod 30, which has been cracked into a cap part 32 and a rod part 34.

The connecting rod 30 has a larger end 38 including a cap part 32 and a rod part 34 which are integrally united across a substantially circular joint hole 36, and a smaller end 40 positioned at an end of the rod part 34 remotely from the larger end 38. The connecting rod 30 is integrally formed by casting or forging, for example.

The larger end 38 has a pair of bolt holes 42a, 42b defined therein on both sides of the connecting rod 30 by a boring mechanism such as a drill or the like. In a process of assembling an engine, for example, unillustrated bolts are threaded respectively into the bolt holes 42a, 42b from the cap part 32 side, thereby fastening the cap part 32 to the rod part 34. When the cap part 32 and the rod part 34 are thus joined to each other, the larger end 38 of the connecting rod 30 is connected to a crankpin of the engine.

In FIG. 1A, cracking regions 44 where the larger end 38 will be cracked into the cap part 32 and the rod part 34 are positioned at a boundary between the cap part 32 and the rod part 34. The cracking regions 44 are disposed on both side of the larger end 38 centrally across the joint hole 36.

Figure 3:
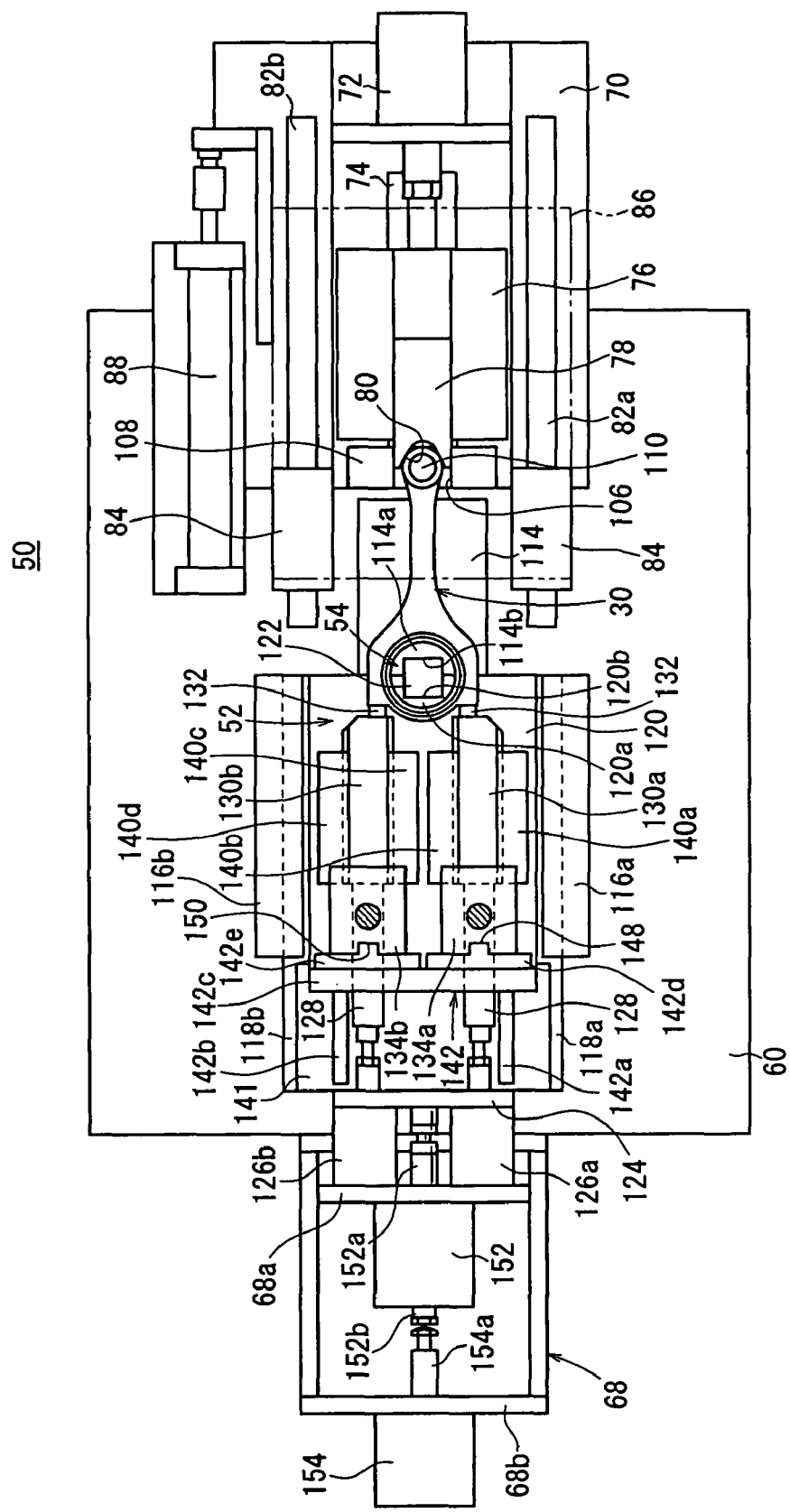
FIG. 3 is a plan view, partly in cross section, of the cracking apparatus shown in FIG. 2.
Figure 4:
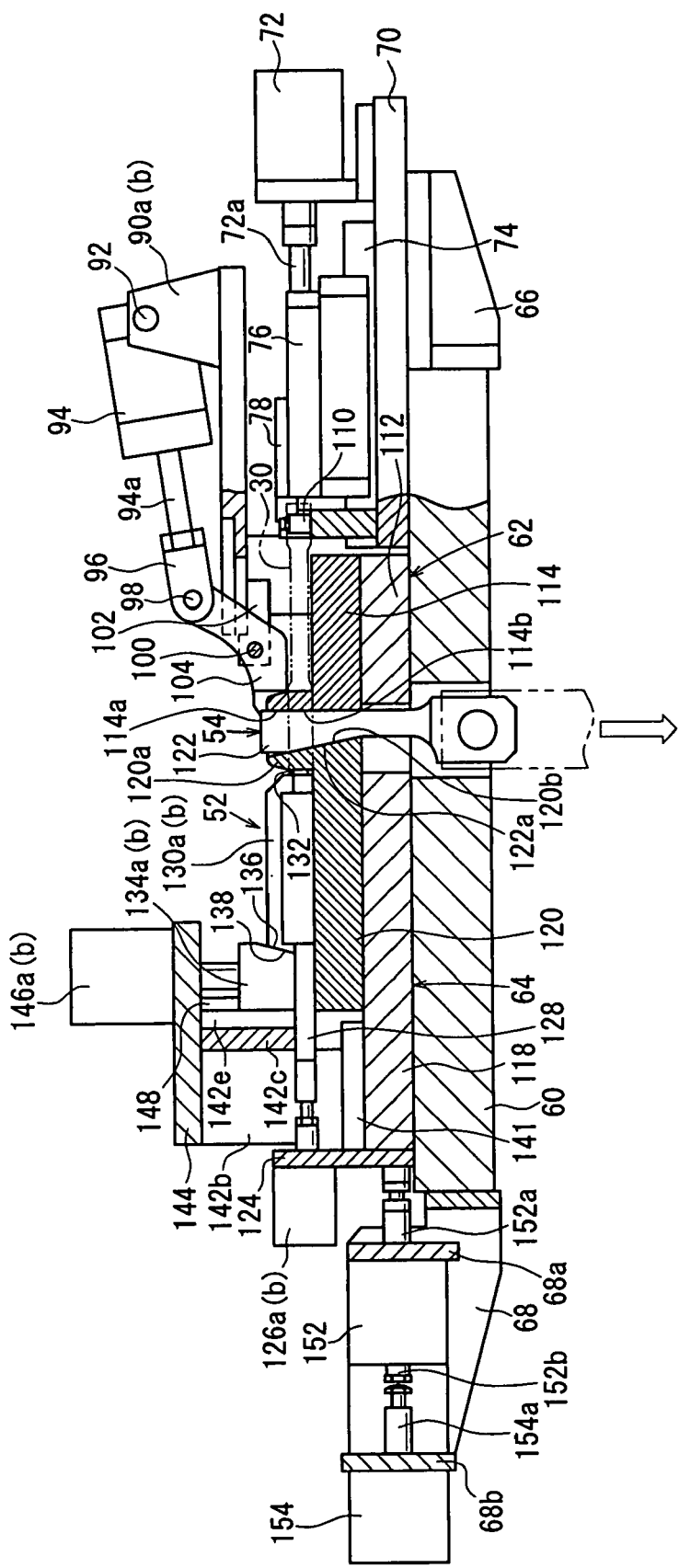
FIG. 4 is a vertical cross-sectional view of the cracking apparatus shown in FIG. 2 taken along an axial direction thereof.

A cracking apparatus 50 for cracking a connecting rod according to an embodiment of the present invention is shown in FIGS. 2 through 4. FIG. 2 is an exploded perspective view of the cracking apparatus 50. FIG. 4 is a plan view of the cracking apparatus 50 in FIG. 2. FIG. 3 is a vertical cross-sectional view of the cracking apparatus 50 taken along an axial direction in FIG. 2.

The cracking apparatus 50 comprises a workpiece positioning and holding mechanism 52 for setting the connecting rod 30 positioned at a predetermined position and holding the connecting rod 30 thus set, a cracking mechanism 54 for cracking the larger end 38 of the connecting rod 30, a preload applying mechanism 56 (see FIGS. 7 and 8) for applying a preload to the cracking mechanism 54, and a loading mechanism 58 (see FIGS. 7 and 8) for applying an impact load to the cracking mechanism 54 by dropping weights 57.

The workpiece positioning and holding mechanism 52 comprises a base 60 which is of a substantially elongate rectangular shape as viewed in plan, a fixed stage 62 fixedly mounted on the base 60, a movable stage 64 disposed in confronting relation to the fixed stage 62 and movable toward and away from the fixed stage 62 horizontally in the axial directions of the base 60, and first and second brackets 66, 68 secured respectively to the opposite ends of the base 60 and projecting outwardly in the axial directions of the base 60.

The fixed stage 62 includes a fixed table 70 fixed to the base 60 by the first bracket 66, a first oil cylinder 72 secured to the fixed table 70, a movable block 76 coupled to the distal end of a piston rod 72a of the first oil cylinder 72 and movable along a guide rail 74 back and forth in the axial directions of the connecting rod 30, and a first workpiece support member 78 secured in a groove defined in the movable block 76 and projecting a predetermined distance from an end of the movable block 76, the first workpiece support member 78 being actuated by the first oil cylinder 72 to engage the smaller end 40 of the connecting rod 30 and push the smaller end 40 toward the larger end 38 in the axial direction of the connecting rod 30.

Figure 5:
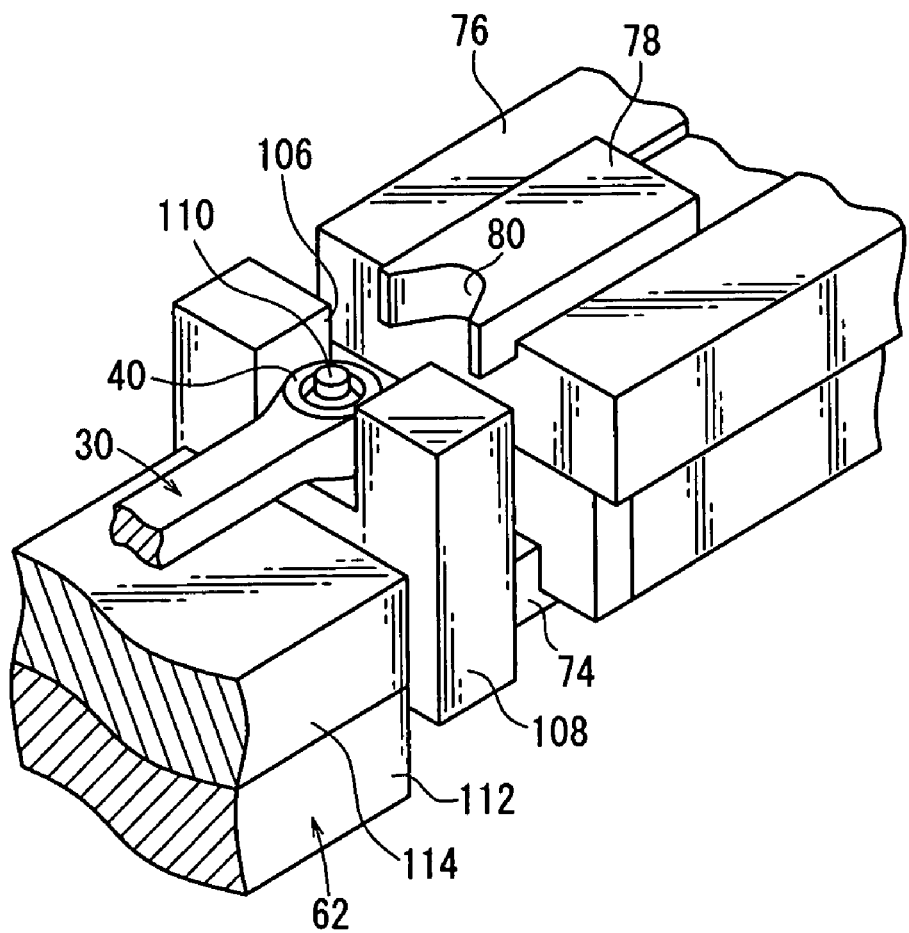
FIG. 5 is an enlarged fragmentary perspective view of the cracking apparatus shown in FIG. 2.

As shown in FIGS. 2 and 5, the first workpiece support member 78 has a tapered engaging slot 80 of V-shaped cross section defined in the distal end thereof for engaging the smaller end 40 of the connecting rod 30.

The fixed stage 62 also has a pair of guide members 82a, 82b fixedly mounted on the fixed table 70 substantially parallel to each other with the movable block 76 disposed therebetween, a slider 86 movable toward and away from the connecting rod 30 on a pair of guide blocks 84 slidable along the respective guide members 82a, 82b, and a first air cylinder 88 fixedly mounted on the fixed table 70 for moving the slider 86 toward and away from the connecting rod 30.

On the slider 86, there are mounted a second air cylinder 94 angularly movable through a predetermined angle about a first pin 92 pivotally attached to a pair of bearing blocks 90a, 90b on the slider 86, a joint member 96 having a bifurcated end and coupled to a piston rod 94a of the second air cylinder 94, and a second workpiece support member 104 having an end pivotally attached to the bifurcated end of the joint member 96 by a second pin 98 and a central portion pivotally supported on a joint plate 102 of the slider 86 by a third pin 100.

The second workpiece support member 104 has a substantially Y-shaped presser 104a on its distal end. When the second air cylinder 94 is actuated, the presser 104a is angularly moved (turned) a predetermined angle about the third pin 100 to press downwardly an upper surface of the larger end 38 (the rod part 34) of the connecting rod 30 for thereby holding the connecting rod 30.

As shown in FIG. 5, a bifurcated fixed block 108 projecting upwardly with a recess 106 of substantially rectangular cross section defined in its upper surface is fixedly mounted on the base 60 near the fixed table 70. A positioning and fixing pin 110 is disposed in the recess 106 of the fixed block 108 for extending through the hole in the smaller end 40 and positioning and holding the smaller end 40.

When the first workpiece support member 78 is brought horizontally into the recess 106 in the fixed block 108, the engaging slot 80 in the distal end of the first workpiece support member 78 reliably engages the smaller end 40 while the first workpiece support member 78 and the connecting rod 30 are being held in axial alignment with each other.

Figure 6:
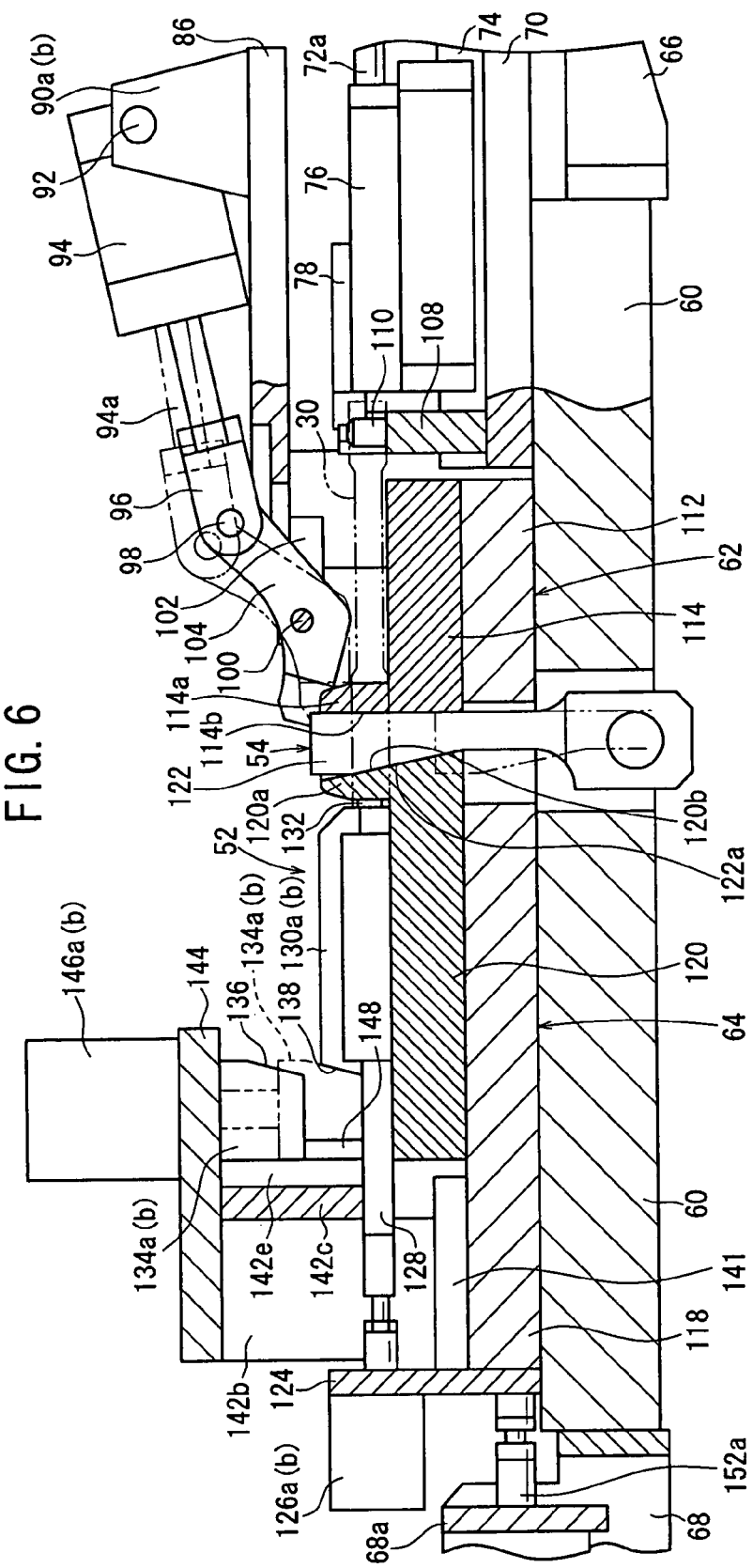
FIG. 6 is an enlarged fragmentary vertical cross-sectional view of the cracking apparatus shown in FIG. 4.

As shown in FIGS. 4 and 6, a holder block 112 fixedly mounted on the base 60 is disposed between the fixed block 108 and the movable stage 64. A first mandrel 114 having a semicircular protrusion 114a for contacting an open edge in the larger end 38 is fixedly mounted on the holder block 112.

As shown in FIGS. 2 and 3, a pair of first guide elements 116a, 116b are disposed substantially parallel to each other for guiding the movable stage 64 in the axial direction of the connecting rod 30. The first guide elements 116a, 116b have axially extending long grooves, respectively, defined therein over the upper surface of the base 60. A slide block 118 has a flange 118a which is slidably disposed in the groove.

As shown in FIGS. 4 and 6, a second mandrel 120 having a semicircular protrusion 120a for contacting an open edge in the larger end 38 is fixedly mounted on an upper surface of the slide block 118. When the second mandrel 120 is displaced in unison with the movable stage 64, the second mandrel 120 moves a predetermined distance toward or away from the first mandrel 114 on the fixed stage 62. The semicircular protrusions 114a, 120a of the first and second mandrels 114, 120 function as a pair of spreaders.

The semicircular protrusions 114a, 120a have recesses 114b, 120b of rectangular cross section defined in respective mating surfaces thereof. When the recesses 114b, 120b are combined with each other, they jointly form a vertical through hole between the semicircular protrusions 114a, 120a. A wedge 122 of rectangular cross section engages in the vertical through hole. At this time, the semicircular protrusions 114a, 120a of the first and second mandrels 114, 120 are combined with each other, providing a circular boss. The circular boss is set in the joint hole 36 in the larger end 38 of the connecting rod 30.

A connecting plate 124 which extends vertically is fixed to an end of the slide block 118. The connecting plate 124 supports on its surface a pair of third air cylinders 126*a*, 126*b* horizontally spaced a predetermined distance from each other (see FIG. 3). The third air cylinders 126*a*, 126*b* have respective piston rods whose distal ends are connected by respective shafts 128 to a pair of third workpiece support members (a first support mechanism) 130*a*, 130*b*. The third workpiece support members 130*a*, 130*b* are movable back and forth on an upper flat surface of the second mandrel 120 in the axial directions of the connecting rod 30 by the respective third air cylinders 126*a*, 126*b*.

A pair of teeth 132 is mounted on axial ends of the respective third workpiece support members 130*a*, 130*b*. The teeth 132 serve to abut against the cap part 32 of the larger end 38 of the connecting rod 30 and press the connecting rod 30 parallel to its axis in a direction from the larger end 38 toward the smaller end 40. The third workpiece support members 130*a*, 130*b* have respective slanted surfaces 138 on the other ends thereof remote from the teeth 132. The slanted surfaces 138 serve to engage pressing surfaces 136 of respective fourth workpiece support members 134*a*, 134*b*.

As shown in FIGS. 2 and 3, the third workpiece support members 130*a*, 130*b* are guided by two pairs of substantially parallel second guide elements 140*a* through 140*d* fixedly mounted on the upper flat surface of the second mandrel 120 for linear displacement in the axial directions of the connecting rod 30.

A secure plate 141 is mounted on the upper surface of the slide block 118. A pair of second oil cylinders (a second support mechanism) 146*a*, 146*b* is fixedly supported on an upper plate 144 that is mounted on the secure plate 141 by a support assembly 142 (see FIG. 2). The second oil cylinders 146*a*, 146*b* have respective vertical piston rods whose distal ends are coupled to respective fourth workpiece support members 134*a*, 134*b* each in the form of a substantially cubic block. The fourth workpiece support members 134*a*, 134*b* are vertically displaceable.

Each of the fourth workpiece support members 134*a*, 134*b* has the pressing surface 136 on one side surface thereof for engaging and pressing the slanted surface 138 of each of the third workpiece support members 130*a*, 130*b* toward the connecting rod 30.

As shown in FIG. 3, the support assembly 142 comprises a pair of first support plates 142*a*, 142*b* vertically fixed to an upper surface of the secure plate 141 and spaced from each other by a predetermined distance, the first support plates 142*a*, 142*b* extending substantially parallel to the axial directions of the connecting rod 30, a second support plate 142*c* extending substantially horizontally and joined to upper side wall surfaces of the first support plates 142*a*, 142*b*, and a pair of third support plates 142*d*, 142*e* extending substantially parallel to each other along and joined to a vertical surface of the second support plate 142*c*.

The third support plates 142*d*, 142*e* have respective ridges 148 disposed on surfaces thereof and extending vertically substantially parallel to each other. The ridges 148 slidably engage in respective slots 150 defined respectively in the fourth workpiece support members 134*a*, 134*b*, so that the fourth workpiece support members 134*a*, 134*b* can smoothly be guided for vertical movement by the ridges 148.

When the pressing surfaces 136 of the respective fourth workpiece support members 134*a*, 134*b* engage the respective slanted surfaces 138 of the third workpiece support members 130*a*, 130*b* and push the third workpiece support members 130*a*, 130*b*, the third workpiece support members 130*a*, 130*b* generate reactive forces. The reactive forces thus generated are borne by the third support plates 142*d*, 142*e* held by the vertically extending first support plates 142*a*, 142*b*.

The second bracket 68 which projects outwardly from the base 60 has a first side wall 68*a* with a fourth air cylinder 152 fixedly mounted thereon. The fourth air cylinder 152 has a first piston rod 152*a* whose distal end is connected to the connecting plate 124 for displacing the movable stage 64 in its entirety along the axial directions of the connecting rod 30. The fourth air cylinder 152 is of the double rod type including the first piston rod 152*a* and a second piston rod 152*b* which project respectively from the opposite ends thereof along the axis of a cylinder tube thereof. The first piston rod 152*a* is fixed to the connecting plate 124 joined to the slide block 118, and the second piston rod 152*b* has its distal end as a free end.

The second bracket 68 also has a second side wall 68*b* with a fifth air cylinder 154 fixed thereto. The fifth air cylinder 154 has a piston rod 154*a* whose distal end is positioned in facing relationship to and can abut against the second piston rod 152*b* of the fourth air cylinder 152. When the fifth air cylinder 154 is actuated to extend the piston rod 154*a*, the piston rod 154*a* is brought into abutment with and presses the second piston rod 152*b* of the fourth air cylinder 152 to displace the movable stage 64 in its entirety horizontally.

The cracking mechanism 54 comprises the first and second mandrels 114, 120 having the respective semicircular protrusions 114*a*, 120*a* to be placed in the joint hole 36 in the larger end 38, and the wedge 122 to be pressed in for spreading the first and second mandrels 114, 120 apart from each other.

The semicircular protrusions 114*a*, 120*a* of the first and second mandrels 114, 120 have the recesses 114*b*, 120*b* into which the wedge 122 are inserted. The recess 114*b* in the first mandrel 114 on the fixed stage 62 is defined by a substantially vertical wall surface, and the recess 120*b* in the second mandrel 120 on the movable stage 64 is defined by a tapered surface slanted outwardly in the upward direction (see FIGS. 4 and 6).

The wedge 122 has a tapered surface 122*a* which is progressively slanted away from a vertical plane toward the upper distal end thereof. The wedge 122 is inserted into the recesses 114*b*, 120*b* such that the tapered surface 122*a* is held in sliding contact with the wall surface of the second mandrel 120. When the wedge 122 is urged to move downwardly in FIG. 4, the tapered surface 122*a* slides against the wall surface, and the first mandrel 114 and the second mandrel 120 are slidingly spread away from each other.

Figure 7:
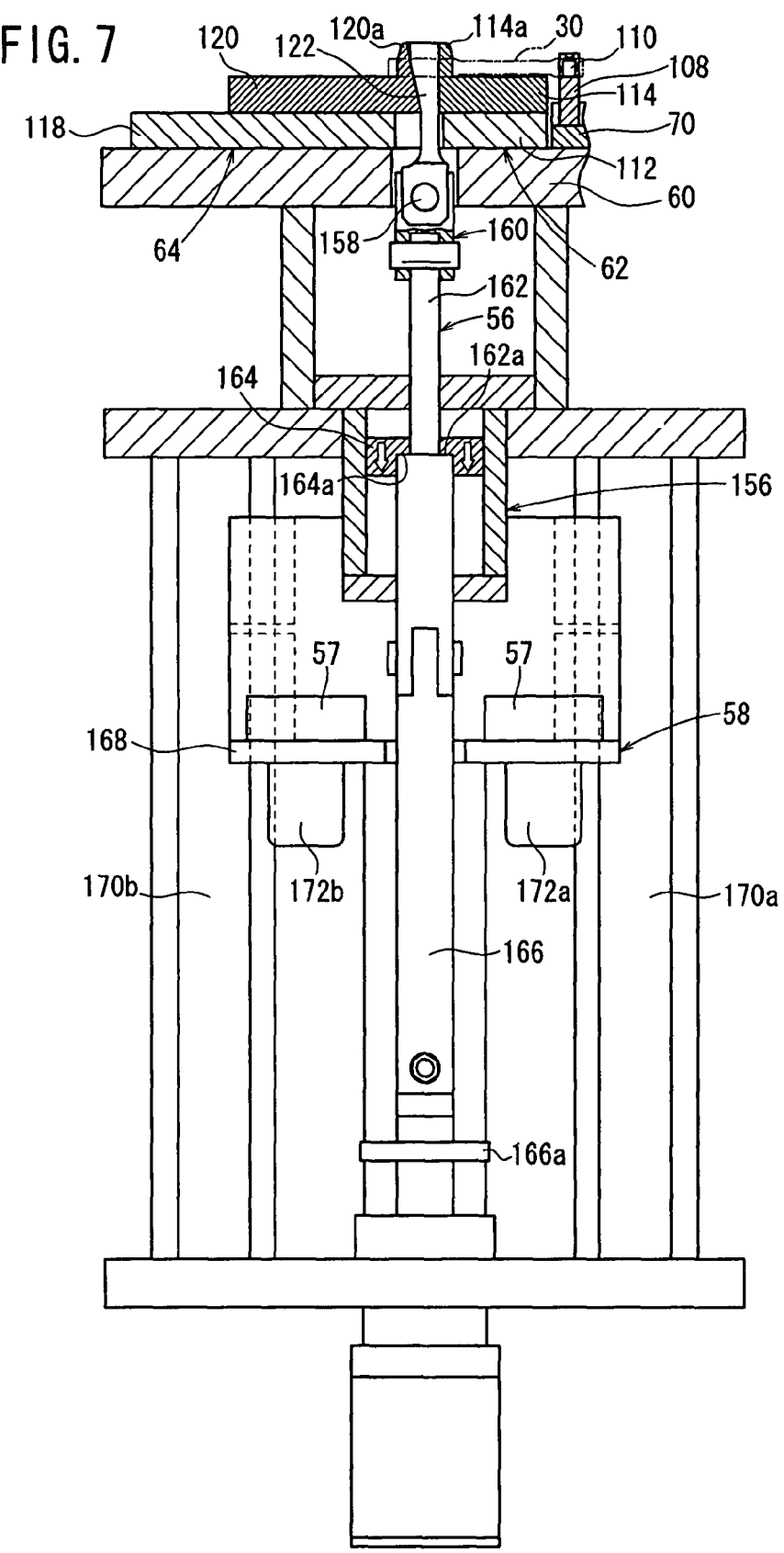
FIG. 7 is a front elevational view, partly in cross section, showing the manner in which a preload is applied by a preload applying mechanism of the cracking apparatus.
Figure 8:
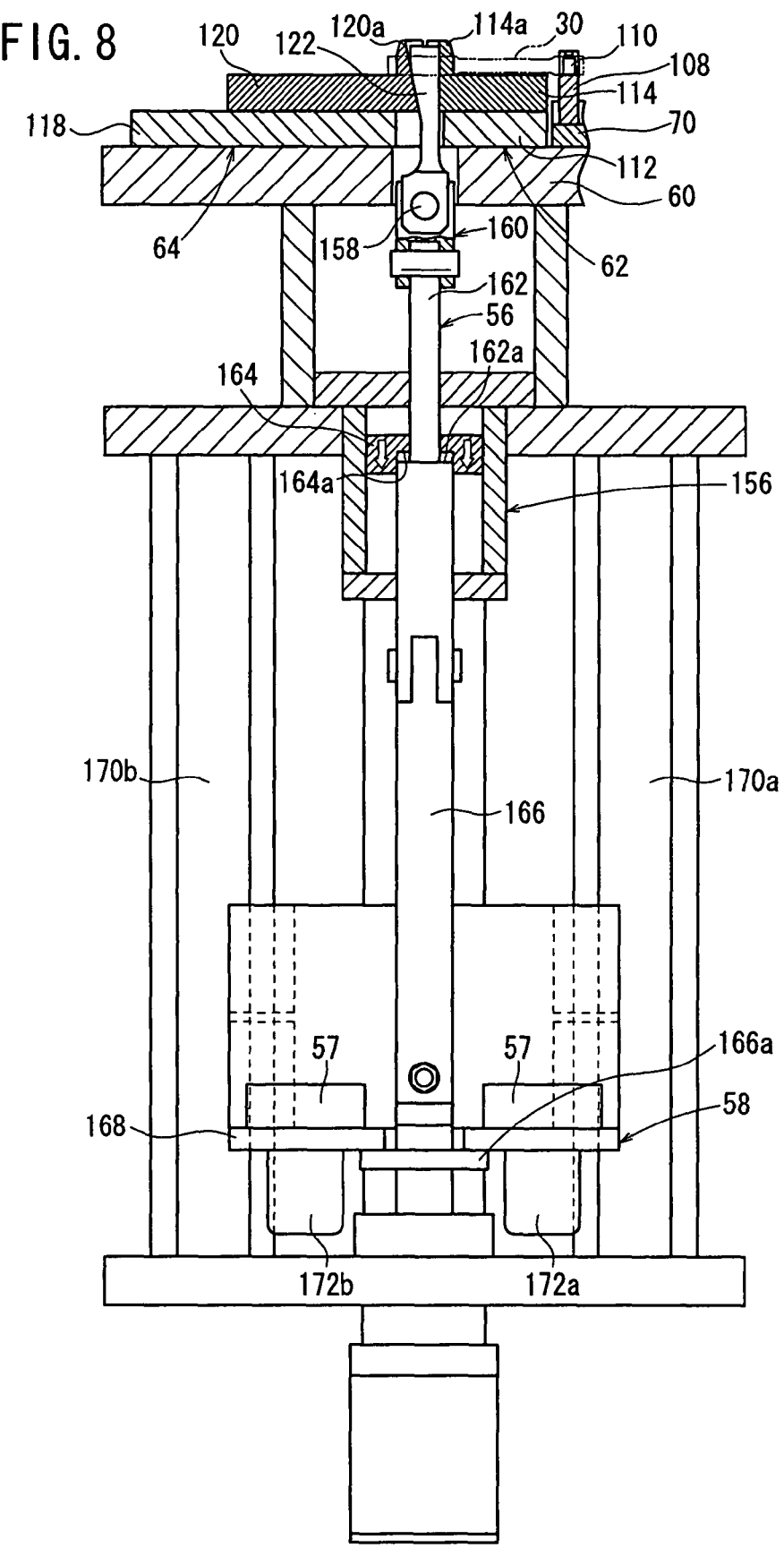
FIG. 8 is a front elevational view, partly in cross section, showing the manner in which an impact load is applied by the preload applying mechanism.

As shown in FIG. 7, the preload applying mechanism 56 has a third oil cylinder 156 for generating a preload to be applied to the wedge 122. The third oil cylinder 156 has a piston rod (a load transmitter) 162 coupled to the end of the wedge 122 through a joint mechanism 160 including a joint pin 158, etc., and a piston 164 having a step 164*a* engaging an annular step 162*a* on the piston rod 162.

The piston rod 162 extends centrally through the piston 164 and is slidable with respect to the piston 164. Thus, the piston 164 of the third oil cylinder 156 is displaceable in unison with the piston rod 162 in the direction in which the wedge 122 is pressed in, and is movable separately from the piston rod 162 in a direction opposite to the direction in which the wedge 122 is pressed in. Stated otherwise, the third oil cylinder 156 applies the preload only in one direction (downward direction) of the piston rod 162 through the piston 164.

The preload applying mechanism 56 and the loading mechanism 58 have a common load transmitting shaft (a load transmitter) 166 connected to the wedge 122 through the piston rod 162. The shaft 166 is integral with the piston rod 162 through the step 162*a*, and has a flange 166*a* at an end thereof remote from the piston rod 162. The flange 166*a* is positionally adjustable in the axial directions of the shaft 166.

The loading mechanism 58 has a vertically movable table 168 supporting the weights 57 thereon and movable downwardly into hitting engagement with the flange 166a to generate an impact load to be applied to the wedge 122 via the shaft 166, a pair of guide members 170a, 170b on which the vertically movable table 168 is vertically slidably guided, and a pair of dampers 172a, 172b for absorbing shocks imposed on the vertically movable table 168 when it falls.

The loading mechanism 58 also has a stopper mechanism (not shown) for adjusting the lower end portion of a downward stroke of the vertically movable table 168, a vertically movable table returning mechanism (not shown) for returning the vertically movable table 168 which has fallen back to an upper standby position, and a returning cylinder (not shown) for returning the wedge which has been displaced downwardly to crack the larger end back to an initial position.

Figure 11:
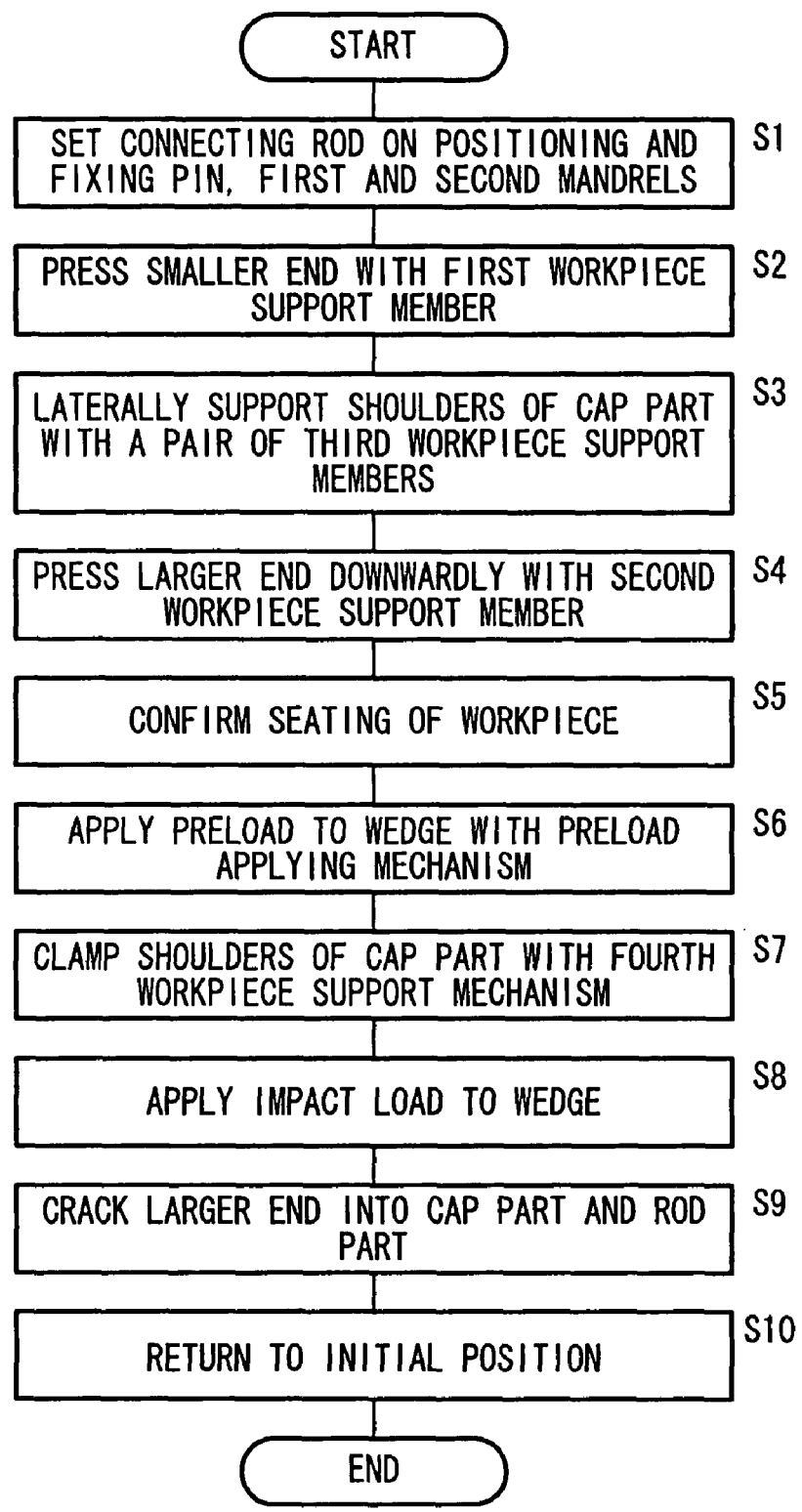
FIG. 11 is a flowchart of an operation sequence of the cracking apparatus shown in FIG. 2.

The cracking apparatus 50 according to the embodiment of the present invention is basically constructed as described above. Operation and advantages of the cracking apparatus 50 will be described in detail below with reference to a flowchart shown in FIG. 11.

First, the integrally formed connecting rod 30 is set in the workpiece positioning and holding mechanism 52 (see FIG. 4). At this time, the smaller end 40 of the connecting rod 30 is positioned by the positioning and fixing pin 110, and the joint hole 36 in the larger end 38 is fitted over the combined semicircular protrusions 114a, 120a of the first and second mandrels 114, 120 (step S1).

The connecting rod 30 thus set in position is then held in position by the workpiece positioning and holding mechanism 52. Specifically, the first oil cylinder 72 is actuated to displace the movable block 76 coupled to the distal end of the piston rod 72a toward the connecting rod 30 while the movable block 76 is being guided by the guide rail 74. The first workpiece support member 78 fixed in the groove in the movable block 76 engages the smaller end 40 of the connecting rod 30 and presses the smaller end 40 axially toward the larger end 38 (step S2).

As shown in FIG. 5, the first workpiece support member 78 moves horizontally into the recess 106 of substantially rectangular cross section defined centrally in the bifurcated fixed block 108. The engaging slot 80 of V-shaped cross section defined in the distal end of the first workpiece support member 78 engages the smaller end 40 of the connecting rod 30 coaxially along the axial direction of the connecting rod 30.

Then, the third air cylinders 126a, 126b are actuated to displace the third workpiece support members 130a, 130b, which are coupled to the distal ends of the piston rods of the third air cylinders 126a, 126b by the shafts 128, slidably axially toward the connecting rod 30 while the third workpiece support members 130a, 130b are being guided by the second guide elements 140a through 140d. The teeth 132 on the axial ends of the respective third workpiece support members 130a, 130b bring into abutment against the respective shoulders of the cap part 32 of the connecting rod 30, and press the connecting rod 30 axially in the direction from the larger end 38 toward the smaller end 40, so that the shoulders of the cap part 32 are supported laterally (horizontally) (step S3).

At this time, the teeth 132 on the axial ends of the respective third workpiece support members 130a, 130b abut against and lightly press the respective shoulders of the cap part 32 of the connecting rod 30 to bring the tilt (axis) of the connecting rod 30 into alignment with a preset positioning direction, i.e., to correct the axial direction of the connecting rod 30.

Then, the second air cylinder 94 is actuated to extend the piston rod 94a coupled to the joint member 96, turning the second workpiece support member 104 downwardly a given angle about the third pin 100. When the second workpiece support member 104 is turned the given angle, the substantially Y-shaped presser 104a on its distal end contacts the upper surface of the larger end 38 of the connecting rod 30 at two points near the joint hole 36, and presses the larger end 38 downwardly (step S4).

At this time, the semicircular protrusions 114a, 120a of the first and second mandrels 114, 120 engage in the joint hole 36 in the larger end 38 of the connecting rod 30, and the positioning and fixing pin 110 engages in the hole in the smaller end 40. A seating confirming mechanism (not shown) confirms when the connecting rod 30 is seated on an upper flat surface of the first mandrel 114 (step 5).

Specifically, for example, the seating confirming mechanism comprises an air outlet hole defined in the upper flat surface of the first mandrel 114, and air from an air source is discharged from the air outlet hole. When the connecting rod 30 is seated on the upper flat surface of the first mandrel 114, the air outlet hole is closed, and a sensor (not shown) detects a reduction in the rate of air discharged from the air outlet hole, i.e., detects a reduction in the pressure of air discharged from the air outlet hole. Therefore, the seating of the connecting rod 30 on the upper flat surface of the first mandrel 114 can reliably be confirmed based on a signal from the sensor.

Then, the third oil cylinder 156 of the preload applying mechanism 56 is actuated to displace the piston 164 downwardly. The downward displacement of the piston 164 causes the step 162a engaging the step 164a to move the piston rod 162 downwardly (see FIG. 7). At the same time, the piston rod 162 displaces the wedge 122 coupled thereto downwardly, thereby applying a preload to the wedge 122 (step S6).

The wedge 122 is sandwiched by and pressed into the recesses 114b, 120b of the first and second mandrels 114, 120. When the wedge 122 is pressed downwardly, the tapered surface of the second mandrel 120 which defines the recess 120b and the tapered surface 122a of the wedge 122 slide against each other, slightly spreading the first and second mandrels 114, 120 apart from each other. The semicircular protrusion 114a of the first mandrel 114 and the semicircular protrusion 120a of the second mandrel 120 are horizontally spaced a given distance from each other, and pressed against the respective inner surfaces of the joint hole 36.

The preload that is applied to the wedge 122 at this time is set to such a level that the larger end 38 is not fractured even when the semicircular protrusions 114a, 120a are pressed against the respective inner surfaces of the joint hole 36 of the larger end 38, i.e., a level which allows the larger end 38 to be elastically deformable. Accordingly, the larger end 38 and the semicircular protrusions 114a, 120a of the first and second mandrels 114, 120 are prevented from wobbling with respect to each other, and the connecting rod 30 as a workpiece is securely held in position by the semicircular protrusions 114a, 120a of the first and second mandrels 114, 120.

With the preload being applied to the joint hole 36 in the larger end 38 of the connecting rod 30, the second oil cylinders 146a, 146b are actuated to displace the fourth workpiece support members 134a, 134b, each in the form of a block, vertically downwardly. At this time, the ridges 148 on the third support plates 142d, 142e of the support assembly 142 engage in the respective slots 150 defined respectively in the side surfaces of the fourth workpiece support members 134a, 134b which confront the third support plates 142d, 142e, guiding the fourth workpiece support members 134a, 134b to move smoothly in the downward direction (see FIG. 3).

When the fourth workpiece support members 134a, 134b are lowered, the pressing surfaces 136 of the respective fourth workpiece support members 134a, 134b slidingly engage the respective slanted surfaces 138 on the ends of the third workpiece support members 130a, 130b, pushing the third workpiece support members 130a, 130b toward the cap part 32 of the connecting rod 30 (step S7).

As a result, the cap part 32 of the connecting rod 30 is completely locked in position between the third workpiece support members 130a, 130b which are pressed by the fourth workpiece support members 134a, 134b as they are lowered and support the respective shoulders of the cap part 32, and the semicircular protrusion 120a of the second mandrel 120 between the shoulders of the cap part 32.

With the cap part 32 of the connecting rod 30 being locked firmly in position, the vertically movable table 168 is released from a stopper, and thereafter the vertically movable table 168 and the weights 57 drop while being guided by the guide members 170a, 170b. When the vertically movable table 168 impinges on the flange 166a on the shaft 166, the shaft 166 is urged to move downwardly, applying an impact load to the wedge 122 (see FIG. 8) (step S8). At this time, since the piston 164 of the third oil cylinder 156 is movable with respect to the shaft 166 in the direction opposite to the direction in which the wedge 122 is pressed in, i.e., the direction in which the impact load is applied, the impact load is not attenuated by the third oil cylinder 156, but is reliably imparted to the wedge 122.

Figure 9:
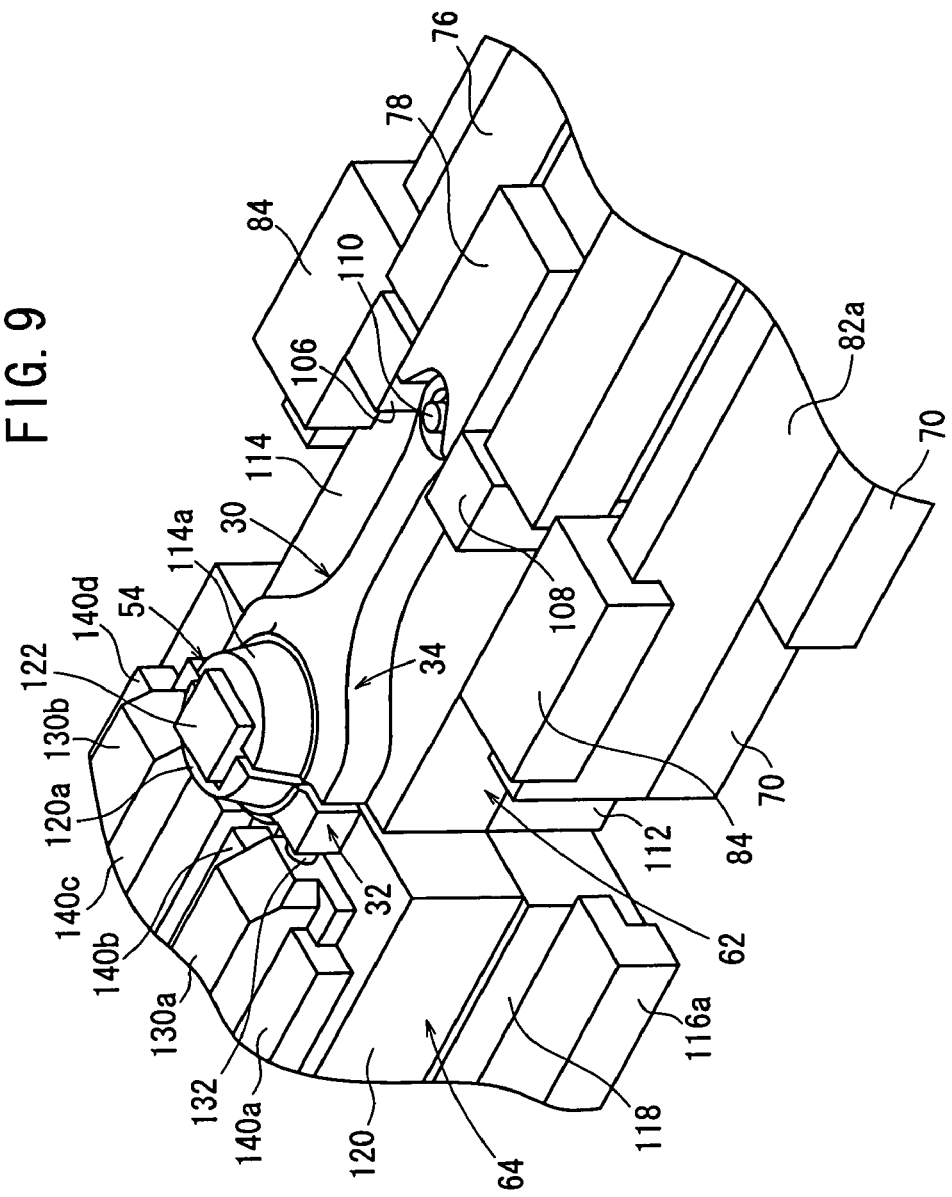
FIG. 9 is an enlarged fragmentary perspective view showing the manner in which a connecting rod is fractured into a cap part and a rod part.
Figure 10:
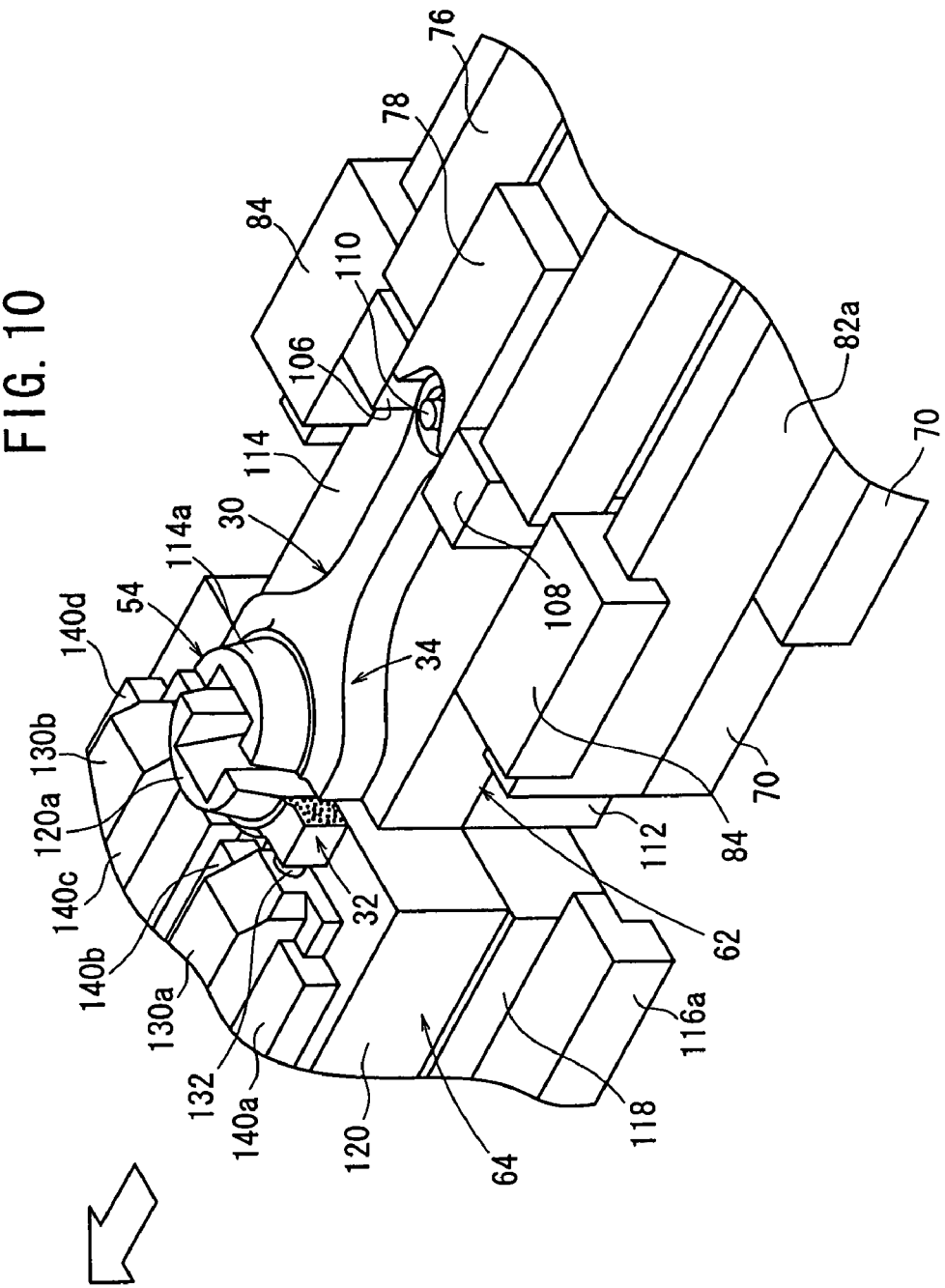
FIG. 10 is an enlarged fragmentary perspective view showing the manner in which the connecting rod is fractured into the cap and the rod.

Under the applied impact load, the wedge 122 is further pressed into the recesses 114b, 120b of the first and second mandrels 114, 120. The tapered surface of the second mandrel 120 which defines the tapered recess 120b and the tapered surface 122a of the wedge 122 slide against each other, while further spreading the first and second mandrels 114, 120 apart from each other. When the first and second mandrels 114, 120 are thus spaced away from each other substantially horizontally, the larger end 38 is deformed beyond its resiliently deformable range and cracked at the cracking regions 44 where stresses are concentrated into the cap part 32 and the rod part 34 (see FIGS. 9 and 10) (step S9). Since the cap part 32 is held by the teeth 132 on the third workpiece support members 130a, 130b under the pressure from the second oil cylinders 146a, 146b, the fractured cap part 32 is prevented from being scattered around.

Specifically, with the first mandrel 114 on the fixed stage 62 being fixed in position, when the impact load is applied to the wedge 122, the second mandrel 120 on the movable stage 64 is slidingly displaced in unison with the slide block 118 on the base 60 while being guided by the first guide elements 116a, 116b.

In other words, the rod part 34 of the connecting rod 30 is fixedly mounted on the fixed stage 62 by the first mandrel 114, the positioning and fixing pin 110, and the first workpiece support member 78, and the cap part 32 is firmly locked in position by the fourth workpiece support members 134a, 134b, the third workpiece support members 130a, 130b, and the second mandrel 120. When the second mandrel 120 and the slide block 118 of the movable stage 64 are then slidingly displaced on the base 60 away from the fixed stage 62, the connecting rod 30 is cracked into the cap part 32 and the rod part 34.

After the larger end 38 of the connecting rod 30 is cracked into the cap part 32 and the rod part 34, the non-illustrated returning cylinder is actuated to lift the wedge 122 back to its initial position. Also, the fourth air cylinder 152, which is fixed to the movable stage 64 through the second bracket 68, is actuated such that the first piston rod 152a is extended for displacing the movable stage 64 toward the fixed stage 62. Then, the fourth air cylinder 152 is stopped so that a clearance of about 2 mm is left between the fractured surfaces of the cap part 32 and the rod part 34 of the larger end 38. If the fractured surfaces of the cap part 32 and the rod part 34 were brought into abutment, the fractured surfaces would be damaged. In this case, if the cap part 32 and the rod part 34 would be integrally connected to each other later by screwing bolts, the fractured surfaces would not mesh with each other, causing a step or positional misalignment.

Then, the first oil cylinder 72, the second oil cylinders 146a, 146b, the second air cylinder 94, and the third air cylinders 126a, 126b are actuated to return the first through fourth workpiece support members 78, 104, 130a, 130b, 134a, 134b substantially simultaneously to their initial positions (step S10).

After the components which have restrained the cap part 32 and the rod part 34 of the fractured connecting rod 30 have been returned to their initial positions, thereby releasing the connecting rod 30, the cap part 32 and the rod part 34 are gripped by respective chuck mechanisms mounted on arms of a multi-axis robot (not shown), and transferred thereby to a next process. Finally, the fifth air cylinder 154 is actuated to displace the movable stage 64 back to its initial position.

Figure 12:
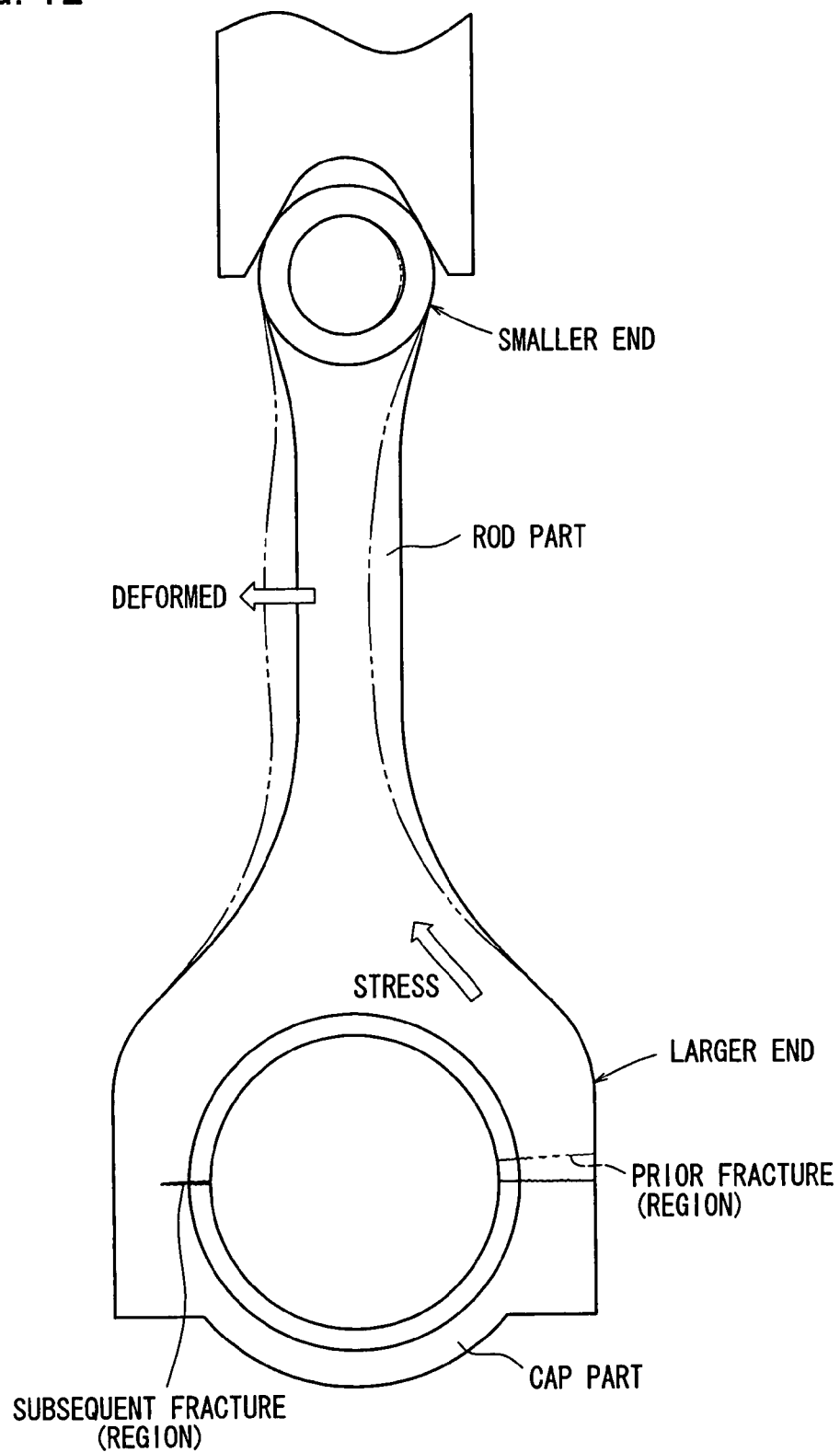
FIG. 12 is a view illustrative of how the connecting rod is adversely affected by the time lag between a prior fracture and a subsequent fracture when the connecting rod is fractured into a cap part and a rod part.

For example, as shown in FIG. 12, when a larger end is cracked into a cap part and a rod part by a conventional cracking apparatus (not shown), if there is a time lag between a prior fracture (region) and a subsequent fracture (region), then stresses from the prior fracture act on the rod part, applying a force tending to deform the rod part toward the subsequent fracture region. As a result, adversely, the rod part is deformed as indicated by the two-dot-and-dash lines in FIG. 12, and the hole in the smaller end is deformed. The connecting rod 30 is required to have high dimensional accuracy with respect to the configuration of the rod part and the configuration of the hole in the smaller end because of desired product characteristics thereof.

Stated otherwise, when the integrally formed connecting rod 30 is cracked into two parts, i.e., the cap part 32 and the rod part 34, bending stresses act on a portion of the cracked parts, the cracked surfaces tend to be distorted partly or the accuracy of the parts tends to be adversely affected. Specifically, each of the two parts has two legs after it has been cracked. When the parts are cracked, their cracking does not progress simultaneously in the legs. Instead, generally, one of the legs starts to be cracked earlier, and then other leg starts to be cracked with a slight time lag. When the cracking of one of the legs which is fractured earlier is finished, the cracking of the other leg which is fractured subsequently is still in progress. In at least a final phase of the cracking of the other leg, the parts begin to be separated from each other in the leg which has been cracked earlier.

According to the present embodiment, the rod part 34 of the larger end 38 of the connecting rod 30 is fixed to the fixed stage 62, and the cap part 32 is firmly fixed to the movable stage 64 by the third workpiece support members 130a, 130b and the second oil cylinders 146a, 146b which lock the third workpiece support members 130a, 130b.

When the larger end 38 of the connecting rod 30 is cracked into the cap part 32 and the rod part 34, only the cap part 32 is displaced in unison with the movable stage 64. Therefore, any time lag between the prior fracture and the subsequent fracture at the fractured surfaces of the cap part 32 and the rod part 34 is minimized.

According to the present embodiment, therefore, there is no need to establish timing to release the external pressure as required in conventional technique, and any time lag between the prior fracture and the subsequent fracture is minimized.

Figure 13:
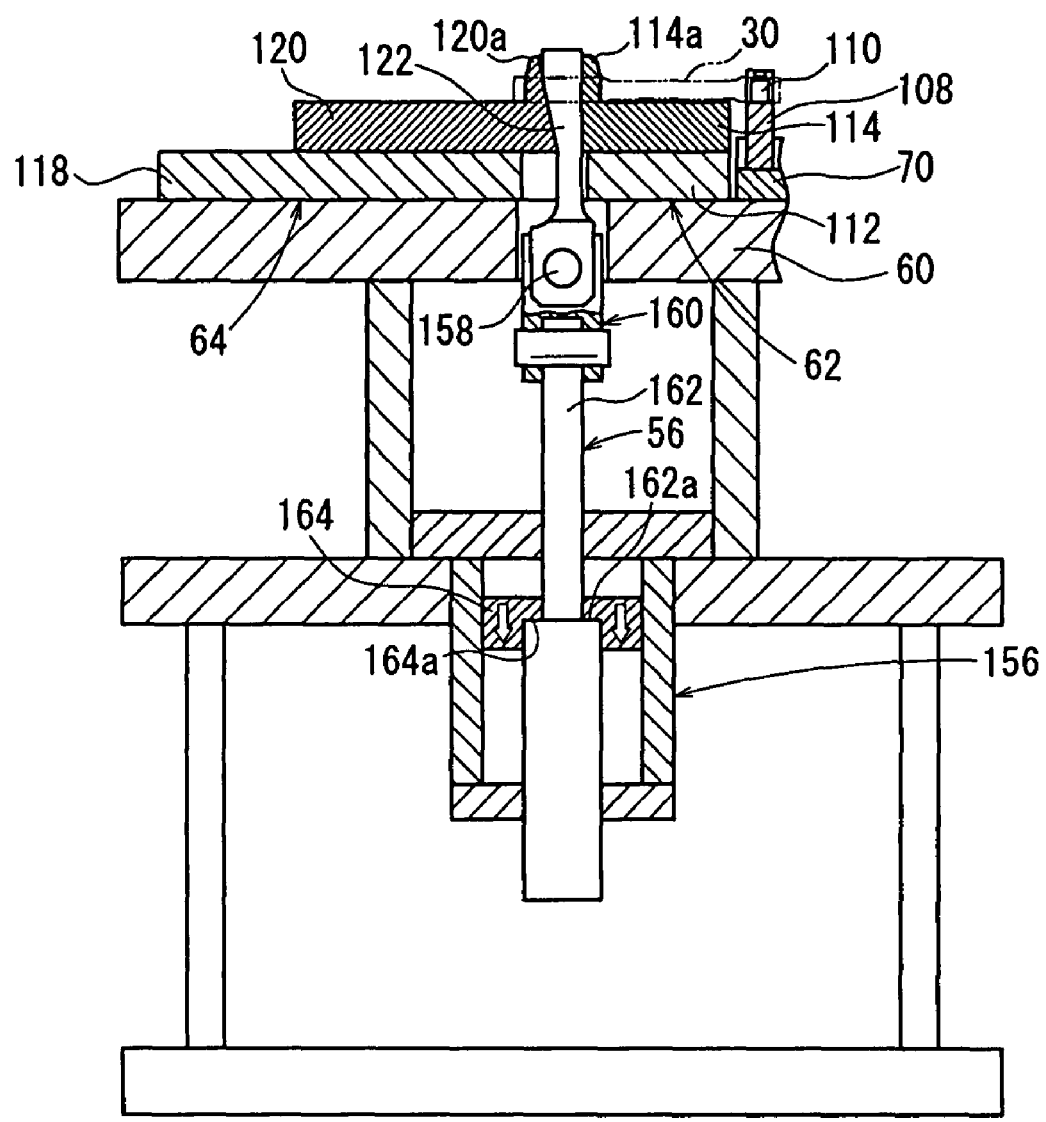
FIG. 13 is a vertical cross-sectional view of a cracking apparatus according to another embodiment of the present invention.

According to the present embodiment, furthermore, the connecting rod 30 is cracked by the impact load that is generated when the weights drop, but the invention is not limited to this embodiment. FIG. 13 shows a cracking apparatus according to another embodiment of the present invention in which the oil cylinder 156 functioning as a single actuator pulls the wedge 122 downwardly, thereby applying an impact load to the wedge 122.

Figure 14:
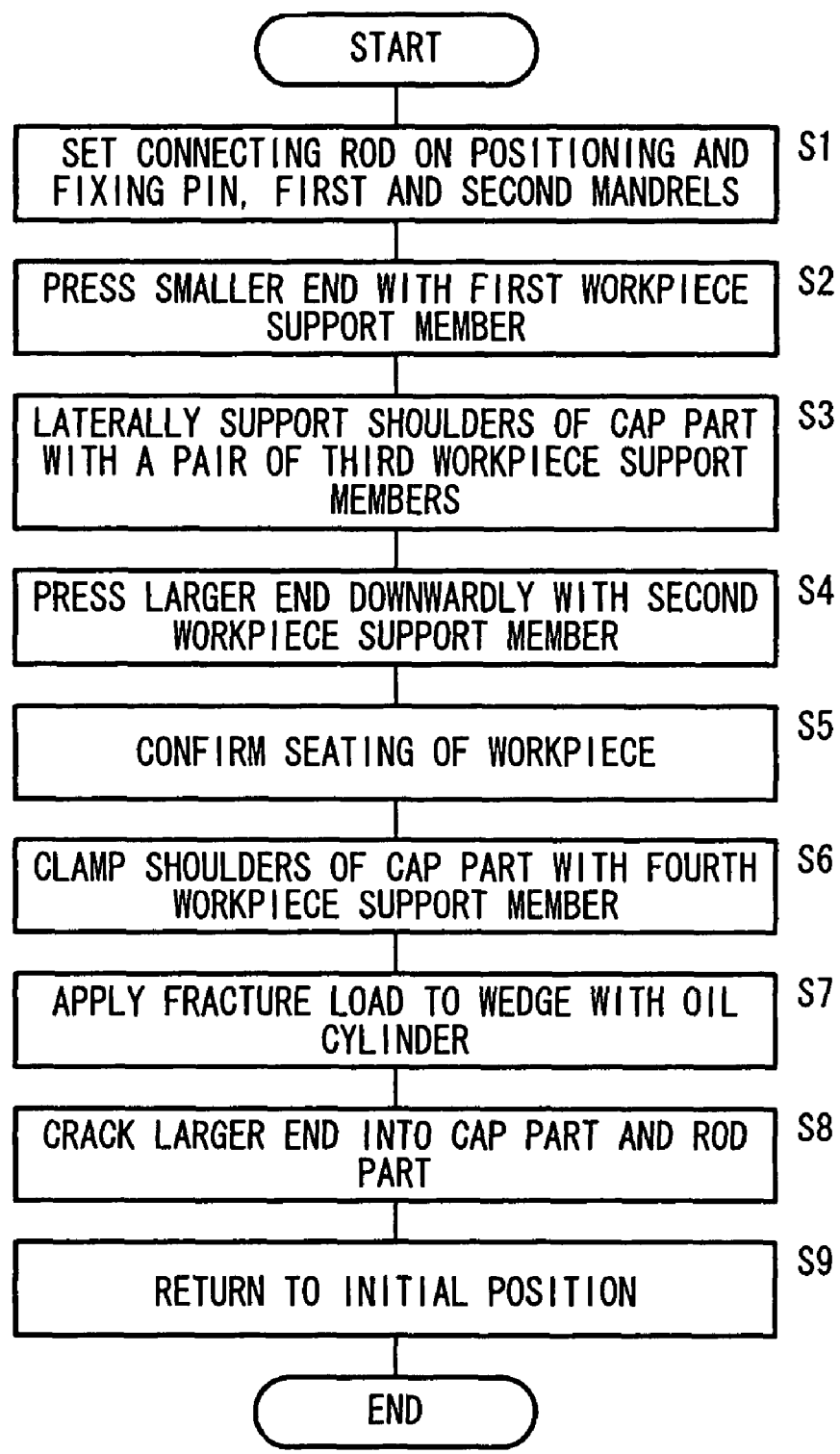
FIG. 14 is a flowchart of an operation sequence of the cracking apparatus shown in FIG. 13.

FIG. 14 shows an operation sequence of the cracking apparatus. In the operation sequence shown in FIG. 14, no preload is applied to the wedge 122, and the pulling force applied by the oil cylinder 156 is gradually increased to crack the larger end 38 into the cap part 32 and the rod part 34 (see step S7).

The invention claimed is:

1. An apparatus for cracking a connecting rod by integrally forming a connecting rod having a larger end and a smaller end, setting a joint hole in said larger end over a pair of spreaders, pressing a wedge into said pair of spreaders, and spreading said spreaders apart from each other to crack said larger end into a cap part and a rod part, comprising:
a workpiece positioning and holding mechanism having a fixed stage fixedly mounted on a base and a movable stage disposed in facing relation to said fixed stage and horizontally movable toward and away from said fixed stage, said workpiece positioning and holding mechanism includes a support surface being arranged to extend beneath said smaller end of the rod part of said connecting rod positioned at a predetermined position with one of said spreaders near said rod part, said rod part being horizontally positioned on the fixed stage and being fixed to said fixed stage and the other spreader near said cap part is fixed to and displaceable in unison with said movable stage for holding said connecting rod thus set; and
a loading mechanism for applying a fracture load in a vertical downward direction in which said wedge is pressed in, to crack said larger end;
wherein said workpiece positioning and holding mechanism comprises:
a first support mechanism, which is displaceable in a horizontal direction, for horizontally pressing shoulders of said larger end of said connecting rod near said cap part toward said smaller end, said first supporting mechanism including a third workpiece support member and a fourth workpiece support member, said third workpiece support member including a first end for abutting against the shoulders of the cap part and a second end operatively positioned adjacent to the fourth workpiece support member;
a second support mechanism for pressing downwardly said fourth workpiece support member, said fourth workpiece support member being movable downwardly in a vertical direction for engaging the first end of the said third workpiece support member with the shoulders of the cap part thereby to lock said first support mechanism to prevent said first support mechanism from being displaced in the horizontal direction; and
a second workpiece support member having a presser, said second workpiece support member being actuated wherein said presser presses downwardly on an upper surface of said rod part of said connecting rod;
said first support mechanism and said second support mechanism being fixed to said movable stage for displacement in unison with said movable stage.

2. An apparatus according to claim 1, wherein a cylinder is fixed to a side wall of a bracket joined to said base, for displacing said movable stage in its entirety in axial directions of said connecting rod.

3. An apparatus according to claim 1, further comprising a preload applying mechanism for applying a preload in a direction in which said wedge is pressed in for pressing said spreaders against an inner surface of a joint hole in said larger end,
wherein after said preload is applied by said preload applying mechanism, said second support mechanism is actuated to clamp said first support mechanism.

4. An apparatus according to claim 1, wherein said loading mechanism comprises a single actuator for pulling said wedge downwardly.

5. An apparatus according to claim 1, wherein said workpiece positioning and holding mechanism comprises:
a first workpiece support member disposed on said fixed stage for engaging said smaller end of said connecting rod and pressing said smaller end axially toward said larger end; and
a cylinder for moving said first workpiece support member toward and away from said smaller end.

6. An apparatus according to claim 5, wherein said first workpiece support member has an engaging portion on an end thereof for engaging said smaller end of said connecting rod.

7. An apparatus according to claim 1, wherein said workpiece positioning and holding mechanism comprises:
a cylinder for angularly moving said second workpiece support member through a predetermined angle about a pin.

8. An apparatus for cracking a connecting rod by integrally forming a connecting rod having a larger end and a smaller end, setting a joint hole in said larger end over a pair of spreaders, pressing a wedge into said pair of spreaders, and spreading said spreaders apart from each other to crack said larger end into a cap part and a rod part, comprising:
a workpiece positioning and holding mechanism having a fixed stage fixedly mounted on a base and a movable stage disposed in facing relation to said fixed stage and horizontally movable toward and away from said fixed stage, said workpiece positioning and holding mechanism includes a supporting surface being arranged to extend beneath said smaller end of the rod part of said connecting rod positioned at a predetermined position with one of said spreaders near said rod part, said rod part being horizontally positioned on the fixed stage and being fixed to said fixed stage and the other spreader near said cap part is fixed to and displaceable in unison with said movable stage for holding said connecting rod thus set; and
a loading mechanism;
said wedge including a tapered surface in sliding contact with one of the spreaders in contact with the larger end of the connecting rod, wherein said loading mechanism applies a fracture load in a vertical downward direction in which said tapered surface of said wedge is pressed in, to crack said larger end;
wherein said workpiece positioning and holding mechanism comprises:
a first support mechanism, which is displaceable in a horizontal direction, for horizontally pressing shoulders of said larger end of said connecting rod near said cap part toward said smaller end, said first supporting mechanism including a third workpiece support member and a fourth workpiece support member, said third workpiece support member including a first end for abutting against the shoulders of the cap part and a second end operatively positioned adjacent to the fourth workpiece support member; and a second support mechanism for pressing downwardly said fourth workpiece support member, said fourth workpiece support member being movable downwardly in a vertical direction for engaging the first end of the said third workpiece support member with the shoulders of the cap part thereby to lock said first support mechanism to prevent said first support mechanism from being displaced in the horizontal direction;

a second workpiece support member having a presser, said second workpiece support member being actuated wherein said presser presses downwardly on an upper surface of said rod part of said connecting rod;

said first support mechanism and said second support mechanism being fixed to said movable stage for displacement in unison with said movable stage when said tapered surface of said wedge is pressed in.

9. An apparatus according to claim 8, further comprising a preload applying mechanism for applying a preload in a direction in which said wedge is pressed in for pressing said spreaders against an inner surface of a joint hole in said larger end, wherein after said preload is applied by said preload applying mechanism, said second support mechanism is actuated to clamp said first support mechanism.

\* \* \* \* \*